(12) United States Patent
Gustavsson

(10) Patent No.: US 8,511,943 B2
(45) Date of Patent: Aug. 20, 2013

(54) MILLING INSERT FOR CHIP REMOVING MACHINING

(75) Inventor: Bjorn Gustavsson, Skinnskatteberg (SE)

(73) Assignee: Seco Tools AB, Fagersta (SE)

( * ) Notice: Subject to any disclaimer, the term of this patent is extended or adjusted under 35 U.S.C. 154(b) by 349 days.

(21) Appl. No.: 12/922,187

(22) PCT Filed: Mar. 10, 2009

(86) PCT No.: PCT/SE2009/000131
§ 371 (c)(1),
(2), (4) Date: Sep. 23, 2010

(87) PCT Pub. No.: WO2009/113941
PCT Pub. Date: Sep. 17, 2009

(65) Prior Publication Data
US 2011/0044774 A1    Feb. 24, 2011

(30) Foreign Application Priority Data

Mar. 13, 2008   (SE) ...................................... 0800576

(51) Int. Cl.
*B23C 5/20*   (2006.01)
(52) U.S. Cl.
USPC ................. 407/42; 407/44; 407/48; 407/113
(58) Field of Classification Search
CPC ............... B23C 5/20; B23C 5/22; B23C 5/24
USPC ...................... 407/44, 42, 113, 48
IPC ...................... B23C 5/20, 5/22, 5/24
See application file for complete search history.

(56) References Cited

U.S. PATENT DOCUMENTS

| | | | | |
|---|---|---|---|---|
| 5,727,911 | A | * | 3/1998 | Satran et al. ................... 407/42 |
| 5,820,310 | A | | 10/1998 | Boianjiu |
| 5,924,826 | A | * | 7/1999 | Bystrom et al. .............. 407/103 |
| 5,931,613 | A | * | 8/1999 | Larsson ........................ 407/103 |

(Continued)

FOREIGN PATENT DOCUMENTS

| DE | 36 17 119 A1 | 11/1987 |
|---|---|---|
| EP | 1 524 051 A2 | 4/2005 |

(Continued)

OTHER PUBLICATIONS

International Search Report, dated May 18, 2009, from corresponding PCT application.

*Primary Examiner* — Daniel Howell
*Assistant Examiner* — Ryan Rufo
(74) *Attorney, Agent, or Firm* — WRB-IP LLP

(57) ABSTRACT

A milling insert (1) for chip removing machining, has a positive basic geometry, including at least three main cutting edges (H1-H3) and three associated minor cutting edges (B1-B3), the milling insert (1) on the underside (L1) thereof being provided with at least two, mutually intersecting, sets of rectilinear grooves/notches, the sets of grooves/notches defining essentially pyramidal projecting parts (P), the sets of grooves/notches intersecting opposite side surfaces (S1-S6) of the milling insert (1). A face milling cutter equipped with such milling inserts is described. Characteristic of the milling insert (1) is that when the milling insert is seen in a planar view, the rectilinear direction (R1-R3) defined by each set of grooves/notches forms a right angle with the tangent of a minor cutting edge (B1-B3).

11 Claims, 4 Drawing Sheets

(56) References Cited

U.S. PATENT DOCUMENTS

| | | | |
|---|---|---|---|
| 6,102,630 A * | 8/2000 | Flolo | 407/42 |
| 6,884,008 B2 * | 4/2005 | Minshall | 407/113 |
| 7,441,992 B2 * | 10/2008 | Hedberg | 407/103 |
| 7,549,358 B2 * | 6/2009 | Pantzar | 82/1.11 |
| 7,585,137 B2 * | 9/2009 | Pantzar | 407/66 |
| 2005/0135884 A1 * | 6/2005 | Lundvall | 407/113 |
| 2008/0031698 A1 * | 2/2008 | Pitonak et al. | 407/113 |
| 2009/0252566 A1 * | 10/2009 | Minshall | 407/102 |

FOREIGN PATENT DOCUMENTS

| | | |
|---|---|---|
| EP | 1 702 703 A1 | 9/2006 |
| WO | 99/00208 A1 | 1/1999 |
| WO | 00/47405 A1 | 8/2000 |
| WO | 02/00382 A1 | 1/2002 |

* cited by examiner

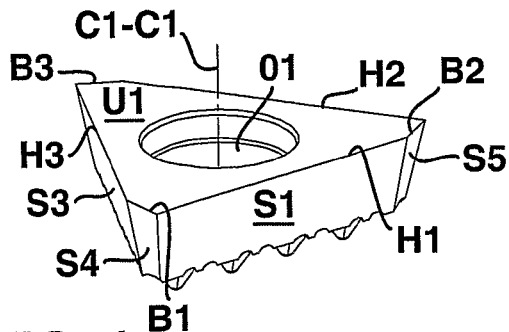
FIG. 1
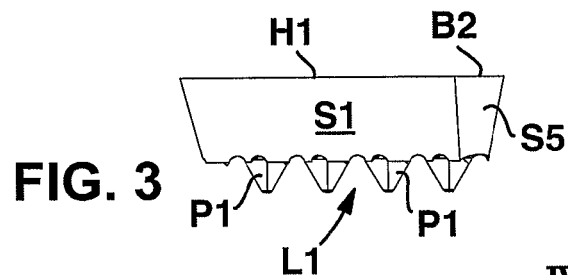
FIG. 3
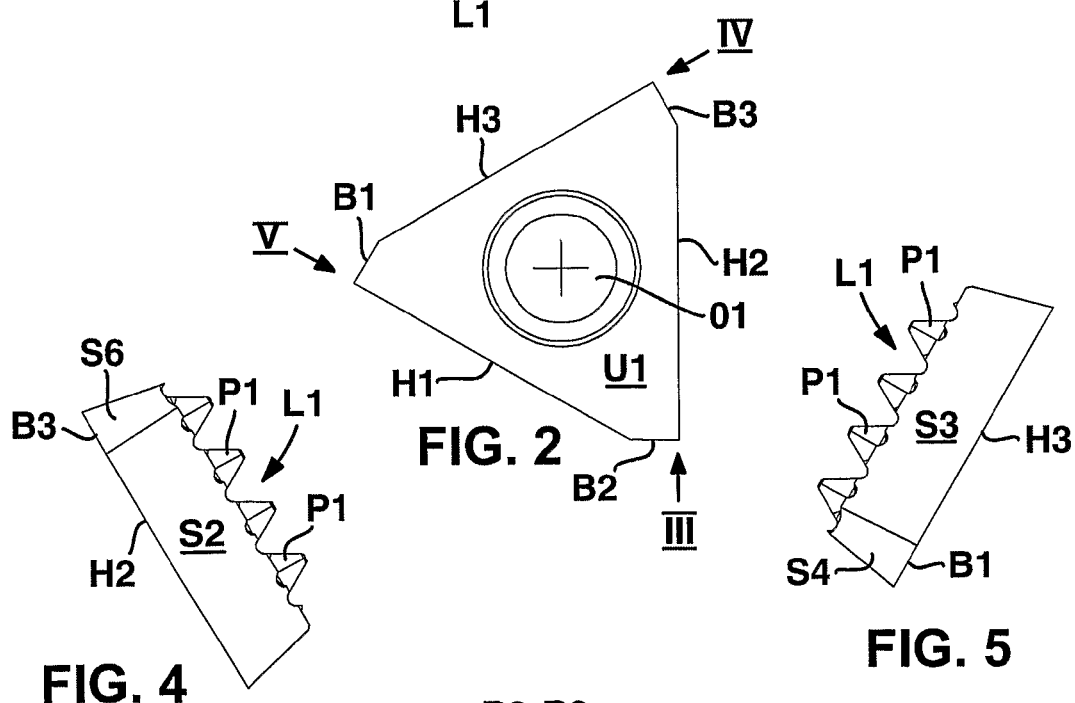
FIG. 2
FIG. 4
FIG. 5
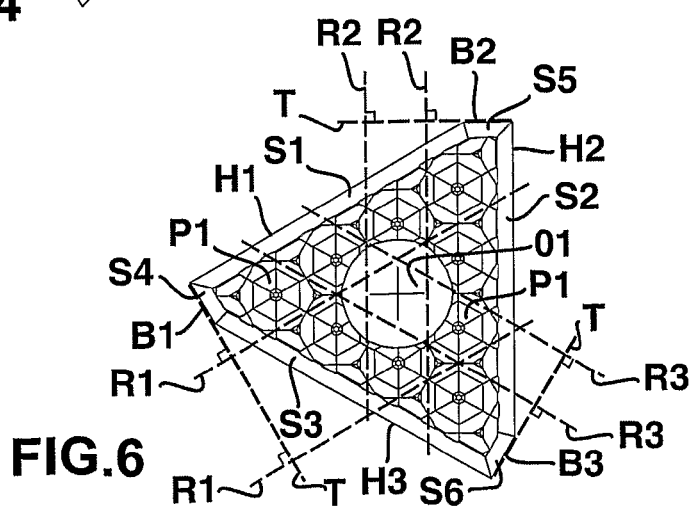
FIG. 6

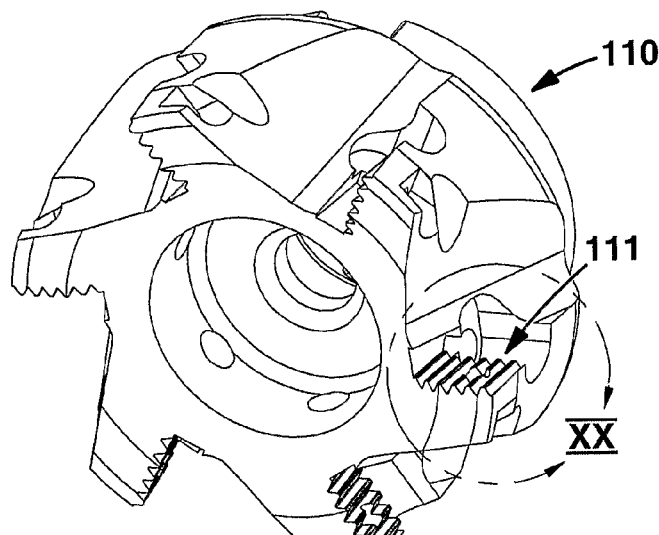
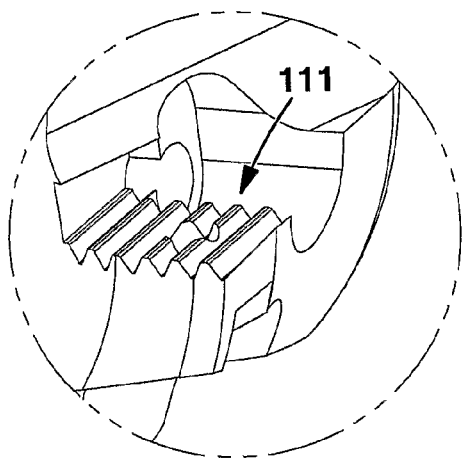
FIG. 19  FIG. 20
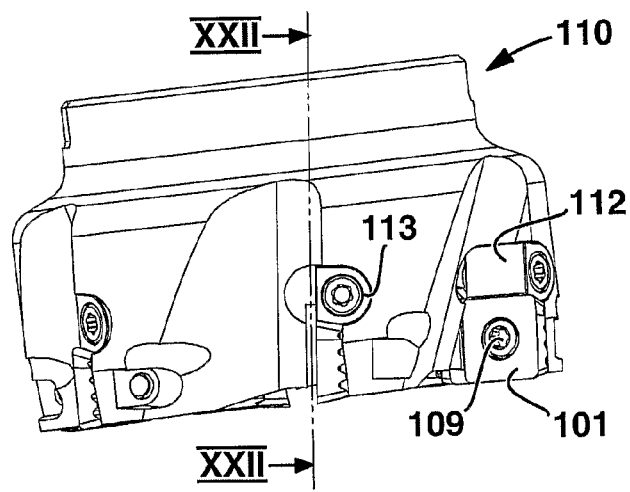
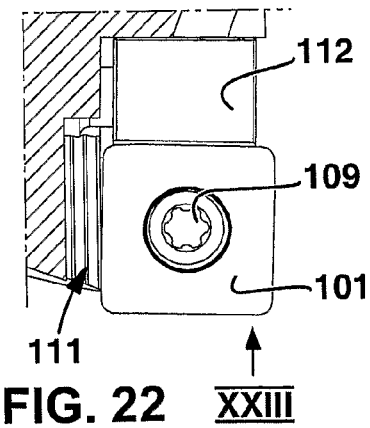
FIG. 21  FIG. 22
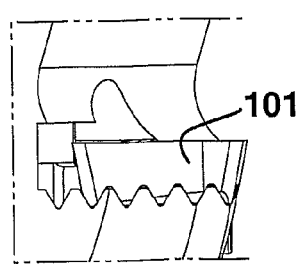
FIG. 23

US 8,511,943 B2

MILLING INSERT FOR CHIP REMOVING MACHINING

BACKGROUND OF THE INVENTION

The present invention relates to a milling insert for chip removing machining, the milling insert comprising at least three main cutting edges and three associated minor cutting edges, the milling insert on the underside thereof being provided with at least two, mutually intersecting, sets of rectilinear grooves/notches, said sets of grooves/notches defining essentially pyramidal projecting parts, said sets of grooves/notches intersecting opposite side surfaces of the milling insert. The present invention also relates to a milling cutter that is equipped with a number of milling inserts according to the present invention.

In WO 0200382, a face milling cutter is shown where the insert seat and the underside of the milling insert are provided with parallel grooves, which co-operate when the milling insert is mounted in the insert seat. The co-operating grooves are used to adjust the location of the milling insert in the axial direction of the milling cutter. In addition, a reliable locking of the milling insert in the insert seat is obtained.

In WO 99/00208, a tool coupling as well as a method for the connection of two tool parts are shown. This tool coupling is characterized in that each one of the connected surfaces comprises at least two sets of notches, the notches of one of the sets being perpendicular to the notches of the other set. In addition, a first set of notches in one of the surfaces delimits a second set of notches in the same surface, while sets of notches in the second surface entirely intersect each other.

DE 3617119 shows a cutting insert for parting and grooving. WO 0047405 relates to a copy turning insert.

OBJECTS AND FEATURES OF THE INVENTION

A primary object of the present invention is to provide a milling insert of the kind defined by way of introduction, wherein the milling insert should be indexable in the insert seat of the milling cutter body at the same time as it is adjustable in the axial direction of the milling cutter body.

Another object of the present invention is that the milling insert preferably should be a milling insert having cutting edge areas of a superhard material, for instance PCD or CBN.

At least the primary object of the present invention is realised by means of a milling insert having the features defined in the subsequent independent claim 1. Preferred embodiments of the milling insert according to the present invention are defined in the dependent claims.

BRIEF DESCRIPTION OF THE DRAWINGS

Below, a preferred embodiment of the invention will be described, reference being made to the appended drawings, wherein:

FIG. 1 shows a perspective view of a triangular milling insert according to the present invention;

FIG. 2 shows a planar view of the milling insert according to FIG. 1;

FIG. 3 shows a view of the milling insert according to FIG. 2 in the direction of the arrow III;

FIG. 4 shows a view of the milling insert according to FIG. 2 in the direction of the arrow IV;

FIG. 5 shows a view of the milling insert according to FIG. 2 in the direction of the arrow V;

FIG. 6 shows a planar view of the underside of the milling insert according to FIG. 1;

FIG. 19 shows a perspective view of a milling cutter body intended to receive milling inserts according to FIGS. 12-18;

FIG. 20 shows an enlarged component in FIG. 19;

FIG. 21 shows a side view of a milling cutter equipped with milling inserts according to FIGS. 12-18;

FIG. 22 shows a section along XXII-XXII in FIG. 21; and

FIG. 23 shows a side view in the direction of the arrow XXIII in FIG. 22.

DETAILED DESCRIPTION OF PREFERRED EMBODIMENTS OF THE INVENTION

Figure 7:
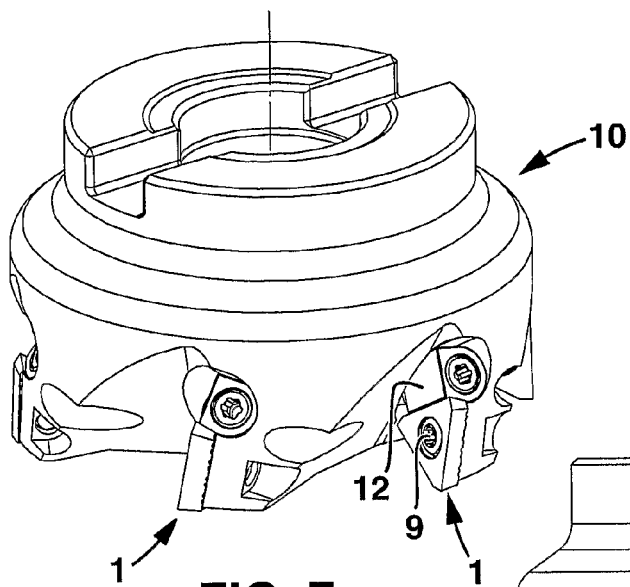
FIG. 7 shows a perspective view of a milling cutter according to the present invention.

The milling insert 1 according to the present invention shown in FIGS. 1-6 has a triangular basic shape and is manufactured from pressed or injection-moulded cemented carbide. By "cemented carbide", reference is here made to WC, TiC, TaC, NbC, etc., in sintered combination with a binder metal such as, for instance, Co or Ni. The milling insert 1 is preferably at least partly coated with layers of, e.g., $Al_2O_3$, TiN and/or TiCN. In certain cases, it may be justified that the cutting edges consist of soldered superhard materials such as CBN or PCD.

The milling insert 1 according to the present invention may have a positive basic geometry, i.e., a truncated pyramid and comprises three first plane or cambered side surfaces S1-S3, which in the active state serve as clearance surfaces in chip removing machining using the milling insert 1 according to the present invention. In order to attain this function of the side surfaces S1-S3, these together generally define the shape of a truncated cone. The milling insert 1 according to the present invention also comprises three second plane or cambered side surfaces S4-S6, which extend between the first side surfaces S1-S3. The second side surfaces S4-S6 are also mutually conical and serve as clearance surfaces in chip removing machining using the milling insert according to the present invention.

The milling insert 1 according to the present invention comprises a plane top surface U1, which together with the first and second side surfaces S1-S3 and S4-S6 defines cutting edges. Thus, the intersection between the side surface S1 and the top surface U1 defines a first main cutting edge H1, the intersection between the side surface S2 and the top surface U1 defines a second main cutting edge H2, and the intersection between the side surface S3 and the top surface U1 defines a third main cutting edge H3.

The intersection between the side surface S4 and the top surface U1 defines a first minor cutting edge B1, the intersection between the side surface S5 and the top surface U1 defines a second minor cutting edge B2, and the intersection between the side surface S6 and the top surface U1 defines a third minor cutting edge B3.

According to a preferred embodiment of the milling insert according to FIGS. 1-6, the main cutting edges H1-H3 are straight while the minor cutting edges B1-B3 are cambered. However, within the scope of the present invention, it is conceivable that the main cutting edges are cambered and that the minor cutting edges are straight. In addition, straight and cambered main cutting edges and minor cutting edges may be combined in all feasible ways.

The main cutting edge H1 may form a principally right angle with the associated minor cutting edge B1, the main cutting edge H2 may form a principally right angle with the associated minor cutting edge B2, and the main cutting edge H3 may form a principally right angle with the associated minor cutting edge B3.

In FIG. 6, a planar view is shown of the underside L1 of the milling insert 1 according to the present invention, the underside L1 being provided with a number of pyramids P1 each one of which, in the shown triangular milling insert 1 according to the present invention, comprises six facets. This is a consequence of three sets of grooves/notches being arranged on the underside L1 of the milling insert.

The pyramids P1 arranged on the underside of the milling insert 1 may be provided by grinding rectilinear grooves/notches on the underside of the milling insert. In each grinding operation, a number of parallel grooves are formed. In order to provide the pyramids P1 shown in FIG. 6, three grinding operations are carried out, the same generating three sets of rectilinear grooves. The rectilinear grooves/notches of each set extend along the entire underside L1 of the milling insert 1, i.e., they intersect two opposite side surfaces S1-S6 of the milling insert 1. The rectilinear direction R1, R2, R3 defined by each set of grooves forms a right angle with the tangent T of an associated minor cutting edge B1-B3, see FIG. 6, when the is milling insert is seen in a planar view. The tangent T connects to the cambered minor cutting edge B1-B3 in the lowest point thereof when the minor cutting edge B1-B3 generates a horizontal work surface.

The milling insert 1 according to the present invention is provided with a mounting hole O1 arranged centrally in the milling insert. The mounting hole O1 penetrates both the top surface U1 and the underside L1. The centre axis of the mounting hole O1 has been given the reference designation C1-C1 in FIG. 1.

Figure 8:
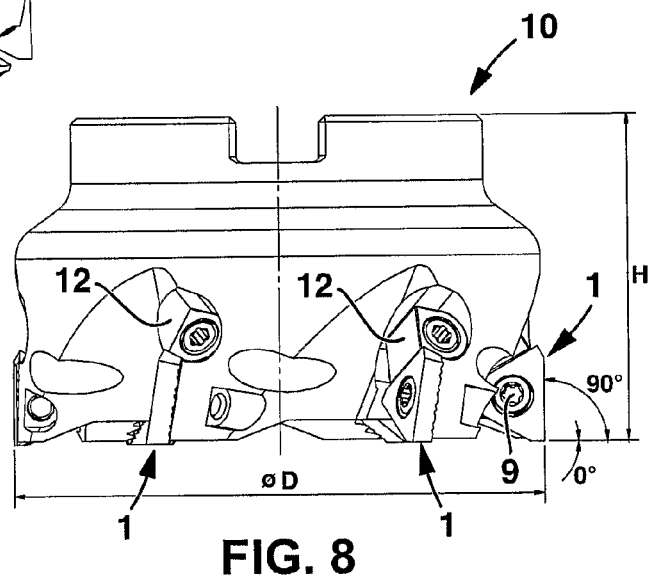
FIG. 8 shows a side view of the milling cutter according to the present invention, the use of the milling cutter as an end mill being particularly illustrated.
Figure 9:
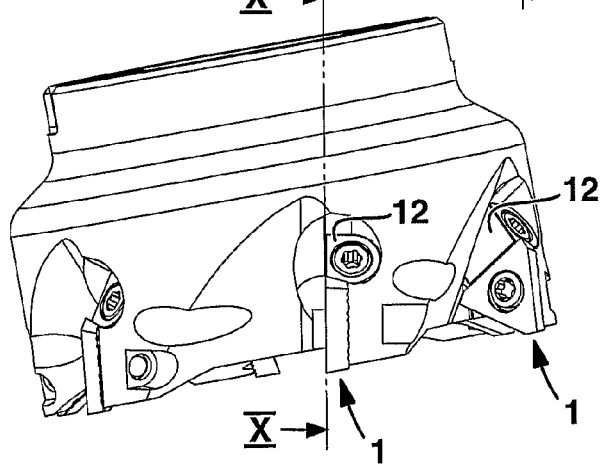
FIG. 9 shows a perspective view of the milling cutter, a plane coinciding with the top surface of the adjacent milling insert having an extension perpendicular to the plane of the paper.

In FIGS. 7-9, a milling cutter according to the present invention is shown, the milling cutter comprising a milling cutter body 10 equipped with a number of milling inserts 1 according to FIGS. 1-6.

Figure 10:
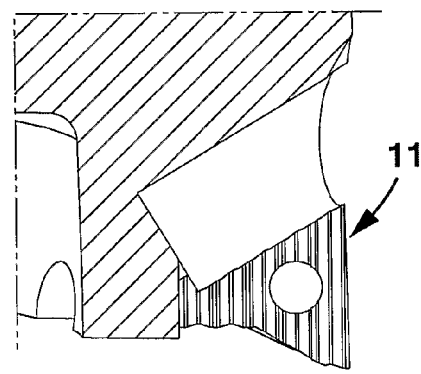
FIG. 10 shows a view according to X-X in FIG. 9, the milling insert being removed.
Figure 11:
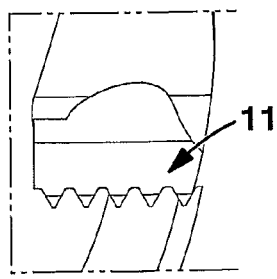
FIG. 11 shows a view in the direction of the arrow XI in FIG. 10.
Figure 12:
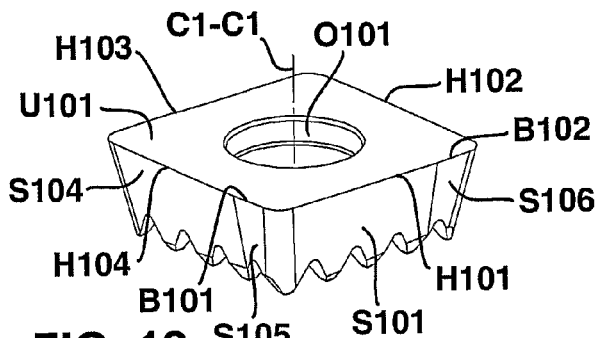
FIG. 12 shows a perspective view of a quadratic milling insert according to the present invention.
Figure 14:
FIG. 14 shows a view of the milling insert according to FIG. 13 in the direction of the arrow XIV.

The milling cutter body F has a number of insert seats 11, see particularly FIGS. 10 and 11, the insert seats 11 being provided with a set of rectilinear, parallel grooves/notches. In that connection, it should be pointed out that the insert seats 11 only have one set of grooves/notches. In the embodiment illustrated, the insert seat 11 is provided with an internally threaded fastening hole O1. The milling insert 1 is clamped in the insert seat by means of a fixing screw 9, see FIG. 8, which extends through the milling insert 1 and is in engagement with the fastening, hole O1. Thereby, the milling insert 1 assumes a correct position in the insert seat 11, though an adjustment of the axial location of the milling insert 1 may be effected. Adjacent to the insert seats 11, the milling cutter body is provided with wedges 12, against which a first side surface S1-S3 of the milling insert 1 abuts. Adjusting screws 13 go through the wedges 42 and are anchored in the milling cutter body 10 by means of a threaded joint. By rotation of the adjusting screws 13, a position adjustment of the milling inserts 1 is attained in the axial direction of the milling cutter, i.e., in a direction parallel with the rotational axis C2-C2 of the milling cutter, which is drawn in FIG. 8. The rotational axis C2-C2 also defines the axial direction of the milling cutter, It is exceptionally important that an adjustment with high precision can be effected in said axial direction of the milling cutter.

By studying the underside LI of the milling insert 1, it is realized that the milling insert 1 can he indexed in three different positions in the insert seat 11. wherein the position adjustment described above can be made for each position. This is enabled by the fact that each set of grooves/notches intersects two opposite side surfaces S1-S6 of the milling insert 1. Thus, the outwardly facing side surface S1-S3 constitutes a clearance surface for the active main cutting edge H1-H3. The side surface S1-S3 being in contact with the wedge 12 constitutes a support surface for the milling insert 1.

As is seen from the right milling insert 1 in FIG. 8, the milling cutter is a so-called end mill, i.e., it mills right-angled corners. This is indicated by the angle of 90° marked in FIG. 8. In this connection, it should be pointed out that the horizontal line defining the right angle constitutes a tangent or rectilinear extension of the active minor cutting edge of the right milling insert 1 in FIG. 8.

In FIGS. 12-18, an alternative embodiment of a milling insert 101 according to the present invention is shown, the milling insert 101 having a quadratic basic shape and may have a positive basic geometry. As for the material of the milling insert 101, reference is made to what has been said above concerning the milling insert 1. The milling insert 101 comprises four first plane side surfaces S101-S104, which in the active state serve as clearance surfaces in chip removing machining using the milling insert 101 according to the present invention. In order to attain this is function of the side surfaces S101-S104, these generally define the shape of a truncated cone. The milling insert 101 according to the present invention also comprises four second plane side surfaces S105-S108, which are situated adjacent to the first side surfaces S101-S104. The second plane or cambered side surfaces S105-S108 are also mutually conical and serve as clearance surfaces in chip removing machining using the milling insert according to the present invention.

The milling insert 101 according to the present invention comprises a plane top surface U101, which together with the first and second side surfaces S101-S104 and S105-S108 defines cutting edges. Thus, the intersection between the side surface 5101 and the top surface U101 defines a first main cutting edge H101, the intersection between the side surface S102 and the top surface U101 defines a second main cutting edge H102, the intersection between the side surface S103 and the top surface U101 defines a third main cutting edge H103, and the intersection between the side surface 104 and the top surface 101 defines a fourth main cutting edge 104.

The intersection between the side surface S105 and the top surface U101 defines a first minor cutting edge H101, the intersection between the side surface S106 and the top surface U101 defines a second minor cutting edge B102, the intersection between the side surface S107 and the top surface U101 defines a third minor cutting edge B103, and the intersection between the side surface 108 and the top surface 101 defines a fourth minor cutting edge B104.

As for whether the main cutting edges and the minor cutting edges are straight or cambered, reference is made to what has been said above in the description of the milling insert according to FIGS. 1-6.

Figures 13, 15, 17:
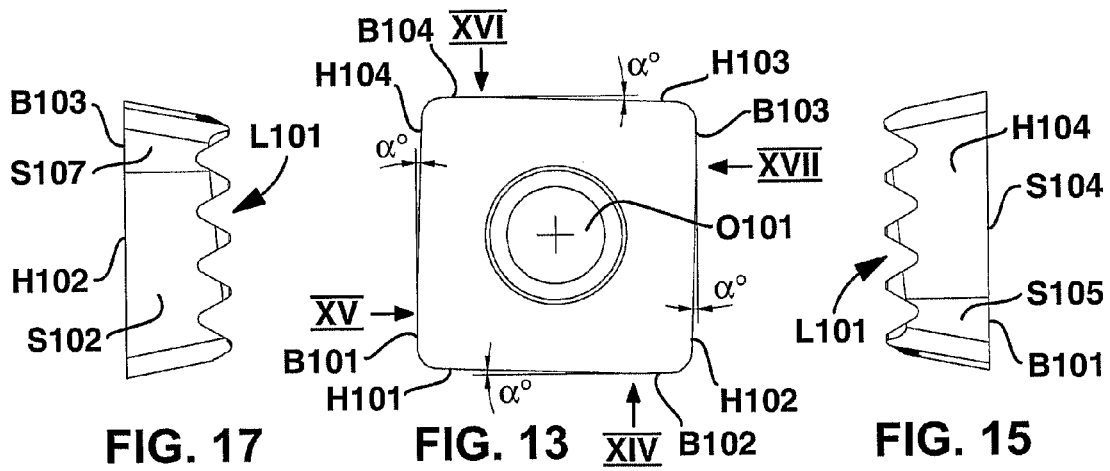
FIG. 13 shows a planar view of the milling insert according to FIG. 12.
FIG. 15 shows a view of the milling insert according to FIG. 13 in the direction of the arrow XV.
FIG. 17 shows a view of the milling insert according to FIG. 13 in the direction of the arrow XVII.
Figure 16:
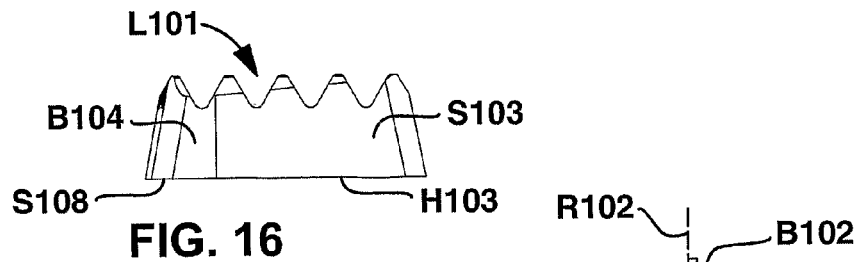
FIG. 16 shows a view of the milling insert according to FIG. 13 in the direction of the arrow XVI.

Such as is indicated in FIG. 13, adjacent main cutting edges 101-104 and is minor cutting edges B101-104 form an angle α with each other, wherein, in an exemplifying and not limiting purpose, it can be mentioned that a suitable value of this angle α is about 2°. This angulation guarantees that there is a clearance for a main cutting edge H101-H104 being next to an active minor cutting edge B101-B104. Correspondingly, said angulation also guarantees that there is a clearance for a minor cutting edge B101-B104 being next to an active main cutting edge H101-H104.

Figure 18:
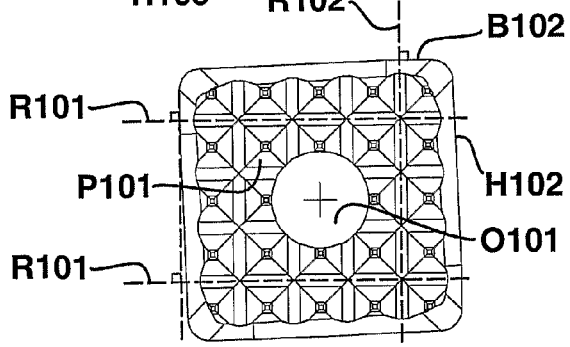
FIG. 18 shows a planar view of the underside of the milling insert according to FIG. 12.

In FIG. 18, a planar view is shown of the underside L101 of the milling insert 101 according to the present invention, the underside L101 being provided with a number of pyramids P101 each one of which, in the shown triangular milling insert 1 according to the present invention, comprises six facets.

The pyramids P101 arranged on the underside of the milling insert 101 may be provided by grinding rectilinear grooves/notches on the underside 101 of the milling insert. In each grinding operation, a number of parallel grooves are formed. In order to provide the pyramids P101 shown in FIG. 18, two grinding operations are carried out, the same generating two sets of rectilinear grooves. Thus, the pyramids P101 comprise four facets. The rectilinear grooves/notches of each set extend along the entire underside L1 of the milling insert 1, i.e., they intersect two opposite side surfaces S101-S108 of the milling insert 101. The rectilinear direction R101, R102 defined by each set of grooves forms a right angle with the tangent of an associated minor cutting edge B101-B104, as seen in planar view of the underside L101 of the milling insert, see FIG. 18.

The milling insert 101 according to the present invention is provided with a mounting hole O101 arranged centrally in the milling insert. The mounting hole O101 penetrates both the top surface U101 and the underside L101. The centre axis of the is mounting hole O101 has been given the reference designation C1-C1 in FIG. 12.

In FIG. 19, it is shown a milling cutter body 110, on which milling inserts 101 according to the present invention are to be mounted. In FIG. 20, the component in FIG. 19 encircled by means of the circle B, is shown on a greater scale. The enlarged component consists of an insert seat 111, this insert seat 111 being provided with a set of rectilinear grooves/notches extending in the axial direction of the milling cutter.

In FIG. 21, a milling cutter according to the present invention is shown, i.e., the milling cutter body 110 is equipped with a number of milling inserts 101 according to FIGS. 12-18. Each one of the milling inserts 101 is clamped in the insert seat by means of a fixing screw 109, see FIGS. 21 and 22, which fixing screw 109 extends through the milling insert 101 and is in engagement with the fastening hole O101. Thereby, the milling insert 101 assumes a correct position in the associated insert seat 111, though an adjustment of the axial location of the milling insert 101 may be effected. Adjacent to the insert seats 111, the milling cutter is provided with wedges 112, against which a first side surface S101-S104 of the milling insert 101 abuts. Adjusting screws 113 go through the wedges 112 and are anchored in the milling cutter body 110 by means of a threaded joint. By rotation of the adjusting screws 113, a position adjustment of the milling inserts 101 is attained in the axial direction of the milling cutter, i.e., in a direction parallel with the rotational axis of the milling cutter, which has an extension in the axial direction of the milling cutter. It is exceptionally important that an adjustment with high precision can be effected in said axial direction of the milling cutter.

By studying the underside L101 of the milling insert 101, it is realized that the milling insert 101 can be indexed in four different positions in the insert seat 111, wherein the position adjustment described above can be made for each position. This is enabled by the fact that each set of grooves/notches intersects four, pair-wise opposite, side surfaces S101-S108 of the milling insert 1. Thus, the outwardly facing side surface S101-S104 constitutes a clearance surface for the active main cutting edge H101-H104. The side surface S101-S104 being in contact with the wedge 113 constitutes a support surface for the milling insert 101. The at least three main cutting edges H1-H3 and H101-H104 may be cambered. Also the at least three minor cutting edges B1-B3 and B101-B104 may be cambered.

The number of grooves/notches of each set of the embodiments described above should only be seen as examples. Thus, within the scope of the present invention, the number of grooves/notches of each set may be more and fewer than what has been shown in the figures. Obviously, however, the number of grooves/notches of each set of the milling insert 1; 101 has to be equal and also that this number is equal to the number of grooves/notches of the insert seat, in which the milling insert 1; 101 is to be mounted.

The disclosures in Swedish patent application No. 0800576-1, from which this application claims priority, are incorporated herein by reference.

The invention claimed is:

1. A milling insert for chip removing machining, the milling insert comprising at least three main cutting edges and at least three associated minor cutting edges, the milling insert on an underside thereof being provided with at least two, mutually intersecting sets of rectilinear grooves/notches, the sets of grooves/notches defining essentially pyramidal projecting parts, the sets of grooves/notches intersecting opposite side surfaces of the milling insert, wherein when the milling insert is seen a planar view, a straight line defined by each set of grooves/notches forms a right angle with at least one of a respective one of the at least three minor cutting edges, an extension of the respective one of the at least three minor cut edges, or a tangent to the respective one of the at least three minor cutting edges.

2. The milling insert according to claim 1, wherein the milling insert has a center hole.

3. The milling insert according to claim 1, wherein the milling insert has three main cutting edges, three minor cutting edges as well as three sets of grooves/notches on the underside of the milling insert.

4. The milling insert according to claim 1, wherein the milling insert has four main cutting edges, four minor cutting edges as well as two sets of grooves/notches on the underside of the milling insert.

5. The milling insert according to claim 1, wherein the at least three main cutting edges are straight.

6. The milling insert according to claim 1, wherein the at least three minor cutting edges are straight.

7. A face milling cutter for chip removing machining, the milling cutter comprising a milling cutter body, the milling cutter body comprising a number of insert seats, the insert seats having grooves/notches that extend parallel with a rotational axis of the milling cutter, the milling cutter comprising a plurality of milling inserts that are mounted in the insert seats, the milling cutter comprising wedges adjacent to each of the insert seats for adjustment of the milling inserts in an axial direction of the milling cutter, each of the milling inserts comprising at least three main cutting edges and three associated minor cutting edges, wherein each one of the milling inserts on an underside thereof is provided with at least two, mutually intersecting, sets of rectilinear grooves/notches, the sets of grooves/notches defining essentially pyramidal projecting parts, the sets of grooves/notches intersecting opposite side surfaces of the milling insert, and when the insert is seen a planar view a straight line defined by each set of grooves/notches forms a right angle with a tangent of a minor cutting edge.

8. The milling insert according to claim 2, wherein the milling insert has three main cutting edges, three minor cutting edges as well as three sets of grooves/notches on the underside of the milling insert.

9. The milling insert according to claim 2, wherein the milling insert has four main cutting edges, four minor cutting edges as well as two sets of grooves/notches on the underside of the milling insert.

10. The milling insert according to claim 2, wherein the at least three main cutting edges are straight.

11. The milling insert according to claim 2, wherein the at least three minor cutting edges are straight.

* * * * *